United States Patent
Maraia et al.

(10) Patent No.: US 10,953,945 B2
(45) Date of Patent: Mar. 23, 2021

(54) MOUNTING ASSEMBLY FOR A MOTORCYCLE PEG

(71) Applicant: Kuryakyn Holdings, LLC, Somerset, WI (US)

(72) Inventors: Micah L. Maraia, Menomonie, WI (US); Jay N. Rogers, Hudson, WI (US)

(73) Assignee: KURYAKYN HOLDINGS, LLC, Somerset, WI (US)

( * ) Notice: Subject to any disclaimer, the term of this patent is extended or adjusted under 35 U.S.C. 154(b) by 211 days.

(21) Appl. No.: 16/173,376

(22) Filed: Oct. 29, 2018

(65) Prior Publication Data

US 2020/0130766 A1 Apr. 30, 2020

(51) Int. Cl.
*B62J 25/06* (2020.01)

(52) U.S. Cl.
CPC .................................. *B62J 25/06* (2020.02)

(58) Field of Classification Search
CPC .................................. B62J 25/00; B62J 25/06
See application file for complete search history.

(56) References Cited

U.S. PATENT DOCUMENTS

| | | |
|---|---|---|
| 4,546,993 A | 10/1985 | Walker |
| D282,154 S | 1/1986 | Cruze et al. |
| 4,591,179 A | 5/1986 | Nakamura |
| 4,638,682 A | 1/1987 | Michiyama |
| 4,771,651 A | 9/1988 | Haro |
| 4,797,791 A | 1/1989 | Burchick |
| D319,037 S | 8/1991 | Hoeptner, III |
| 5,454,580 A | 10/1995 | Lin |
| 5,482,307 A | 1/1996 | Lin |
| 5,638,723 A | 6/1997 | Lin |
| 5,826,900 A | 10/1998 | Steele |
| 5,884,983 A | 3/1999 | Wu |
| 5,997,023 A | 12/1999 | Sauter |
| 6,070,897 A | 6/2000 | Hsieh et al. |
| 6,129,370 A | 10/2000 | Hsieh et al. |
| 6,142,499 A | 11/2000 | Hsieh et al. |
| 6,149,177 A | 11/2000 | Valdez |
| 6,161,859 A | 12/2000 | Cheng |
| 6,193,255 B1 | 2/2001 | Lo |
| 6,199,887 B1 | 3/2001 | Lee |
| 6,247,761 B1 | 6/2001 | Lin |
| 6,485,044 B1 | 11/2002 | Blake |
| 6,499,378 B1 | 12/2002 | Ho |
| 6,688,629 B2 * | 2/2004 | Essinger .................. B62J 25/00 180/219 |
| 6,783,143 B1 | 8/2004 | Hung |
| 7,159,886 B2 | 1/2007 | Schloegel |
| 7,497,291 B1 * | 3/2009 | McKim .................... B62J 25/00 180/90.6 |
| 7,637,523 B2 * | 12/2009 | Fouhy ..................... B62J 25/00 280/291 |

(Continued)

*Primary Examiner* — Kevin Hurley
(74) *Attorney, Agent, or Firm* — Barnes & Thornburg LLP

(57) ABSTRACT

A foot peg assembly for a motorcycle includes a mounting assembly including a mounting flange having an outer wall with a substantially planar front face and a lower surface extending from the outer wall. A mounting plate is configured to be coupled to the mounting flange to secure the mounting assembly to the motorcycle. An arm includes an elongated body extending from a first end coupled to the outer wall of the mounting assembly to a second end. A peg is coupled to the second end of the arm.

20 Claims, 6 Drawing Sheets

(56) References Cited

U.S. PATENT DOCUMENTS

| | | | |
|---|---|---|---|
| 9,809,268 B2* | 11/2017 | Shigihara | B62J 25/00 |
| 10,745,074 B2* | 8/2020 | Griffin | B62J 25/00 |
| 2003/0095414 A1 | 5/2003 | Tracey | |
| 2003/0132592 A1 | 7/2003 | Dombroski | |
| 2004/0222613 A1 | 11/2004 | Cramer | |
| 2016/0159423 A1* | 6/2016 | Gershteyn | B62J 25/00 |
| | | | 280/291 |
| 2018/0339739 A1* | 11/2018 | Kondo | B62J 1/08 |

* cited by examiner

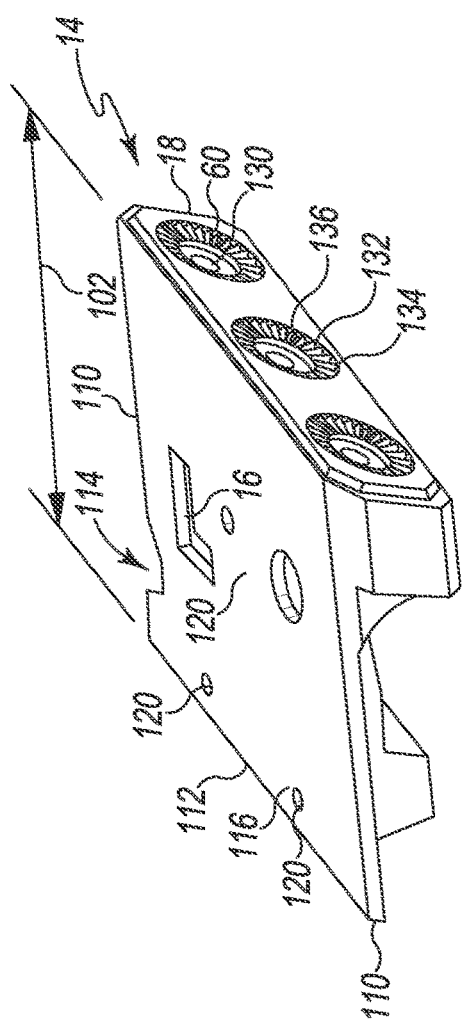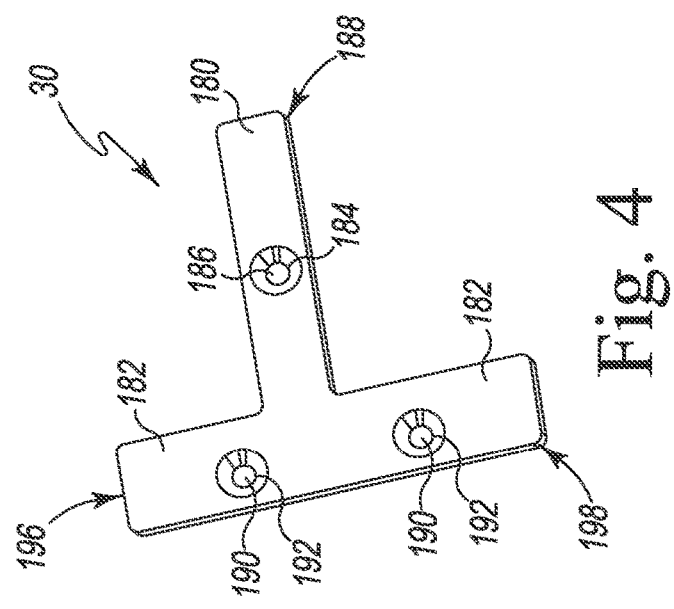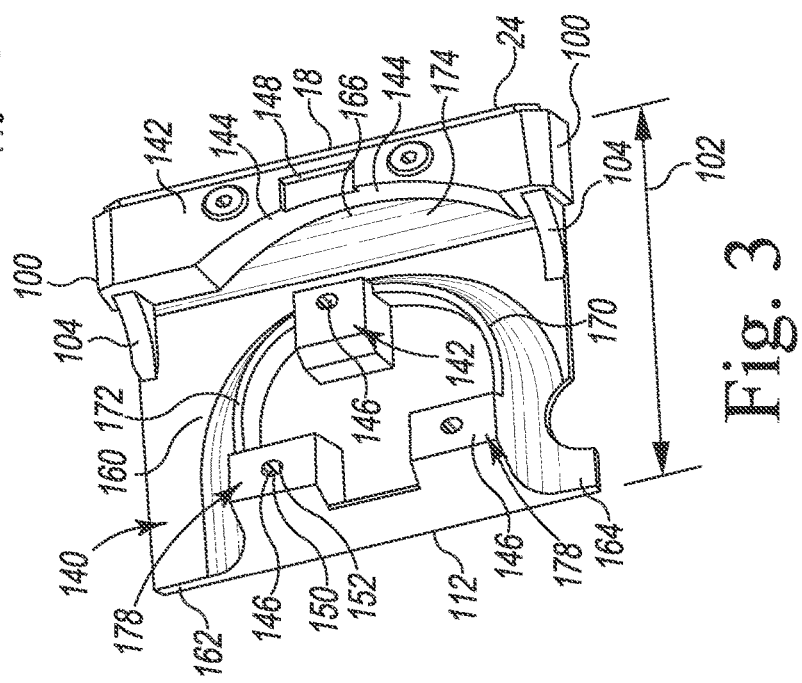

MOUNTING ASSEMBLY FOR A MOTORCYCLE PEG

TECHNICAL FIELD

The present disclosure relates generally to a motorcycle and, more particularly to a peg mounting assembly for a motorcycle.

BACKGROUND

Many motorcycles are configured to be retrofit with after-market products. The after-market products are sold separately from the motorcycle and configured to be added to the motorcycle after purchase. Such after-market products may include pegs, arm rests, lighting systems, or the like. In order to make the after-market product compatible with a particular motorcycle, the after-market product must be designed to fit on or within existing parts of the motorcycle. This may make the development of after-market products challenging as the after-market product must be adaptable with the particular motorcycle for which it is designed.

SUMMARY

According to one aspect of the disclosure, a foot peg assembly for a motorcycle includes a mounting assembly including a mounting flange having an outer wall with a substantially planar front face and a lower surface extending from the outer wall such that a non-orthogonal angle is defined between the substantially planar front face and the lower surface. A mounting plate is configured to be coupled to the mounting flange to secure the mounting assembly to the motorcycle. An arm includes an elongated body extending from a first end coupled to the outer wall of the mounting assembly to a second end. A peg is coupled to the second end of the arm. The peg extends along a longitudinal axis that extends orthogonal to the substantially planar front face of the outer wall.

In some embodiments, the outer wall may have a plurality of attachment slots. The arm may have a mounting peg configured to be received in one of the plurality of attachment slots. The outer wall may have three attachment slots. The mounting peg of the arm may extend along a longitudinal axis and include a first plurality of teeth. The outer wall may include a second plurality of teeth in each attachment slot. The first plurality of teeth are configured to selectively engage the second plurality of teeth to position the arm at a plurality of angular positions relative to the longitudinal axis.

In some embodiments, the mounting flange may have a channel sized to receive a portion of a frame of the motorcycle. The channel of the mounting flange and the mounting plate may cooperate to define a joint configured to receive the portion of the frame to secure the mounting assembly to the motorcycle. The mounting plate may have a first beam extending under the channel to define a portion of the joint. The lower surface of the mounting flange may have a slot sized to receive an end of the first beam. The mounting flange may have a pair of open slots that are connected to the channel and cooperate with the mounting flange and the mounting plate to define the joint. The mounting plate may have a second beam extending orthogonal to the first beam. The second beam may extend from a first end positioned under a first open slot of the pair of open slots to a second end positioned under a second open slot of the pair of slots. The channel may have a curved section.

In some embodiments, a peg mount may be positioned between the arm and the peg and configured to selectively engage the arm to position the peg at a plurality of angular positions relative to the longitudinal axis. The peg mount may have a first end hingedly attached to a second end so that the second end is rotatable relative to the first end.

According to another aspect of the disclosure, a method of coupling a peg to a motorcycle includes securing a portion of a frame of the motorcycle between a mounting plate and a mounting flange. The portion of the frame extending along a first axis. The method also includes attaching an arm to an outer wall of the mounting flange. The outer wall includes a substantially planar front face extending at a non-orthogonal angle relative to the first axis. The method also includes coupling a peg to the arm such that the peg extends along a second axis that extends orthogonal to the substantially planar front face of the outer wall.

In some embodiments, the method may require selecting an attachment slot from a plurality of attachment slots defined in the outer wall. Attaching the arm to the outer wall may require positioning a mounting peg of the arm in the selected attachment slot. Attaching the arm to the outer wall may require rotating the arm about a third axis defined by the mounting peg. Rotating the arm about the third axis defined by the mounting peg may require selecting engaging a first plurality of teeth of the mounting peg with a second plurality of teeth positioned in the selected attachment slot.

In some embodiments, the method may require positioning the portion of the frame in a channel defined in the mounting flange. Positioning the portion of the frame may require positioning a crash guard of the motorcycle in the channel defined in the mounting flange.

In some embodiments, the method may require coupling a peg mount between the arm and the peg. The peg mount may be configured to selectively engage the arm to position the peg at one of a plurality of angular positions relative to the longitudinal axis.

BRIEF DESCRIPTION OF THE DRAWINGS

The detailed description particularly refers to the following figures, in which:

FIG. 2 is a top perspective view of the mounting assembly shown in FIG. 1;

FIG. 3 is a bottom perspective view of the mounting assembly shown in FIG. 1;

FIG. 4 is a top perspective view of the mounting plate shown in FIG. 1;

DETAILED DESCRIPTION OF THE DRAWINGS

Figure 1:
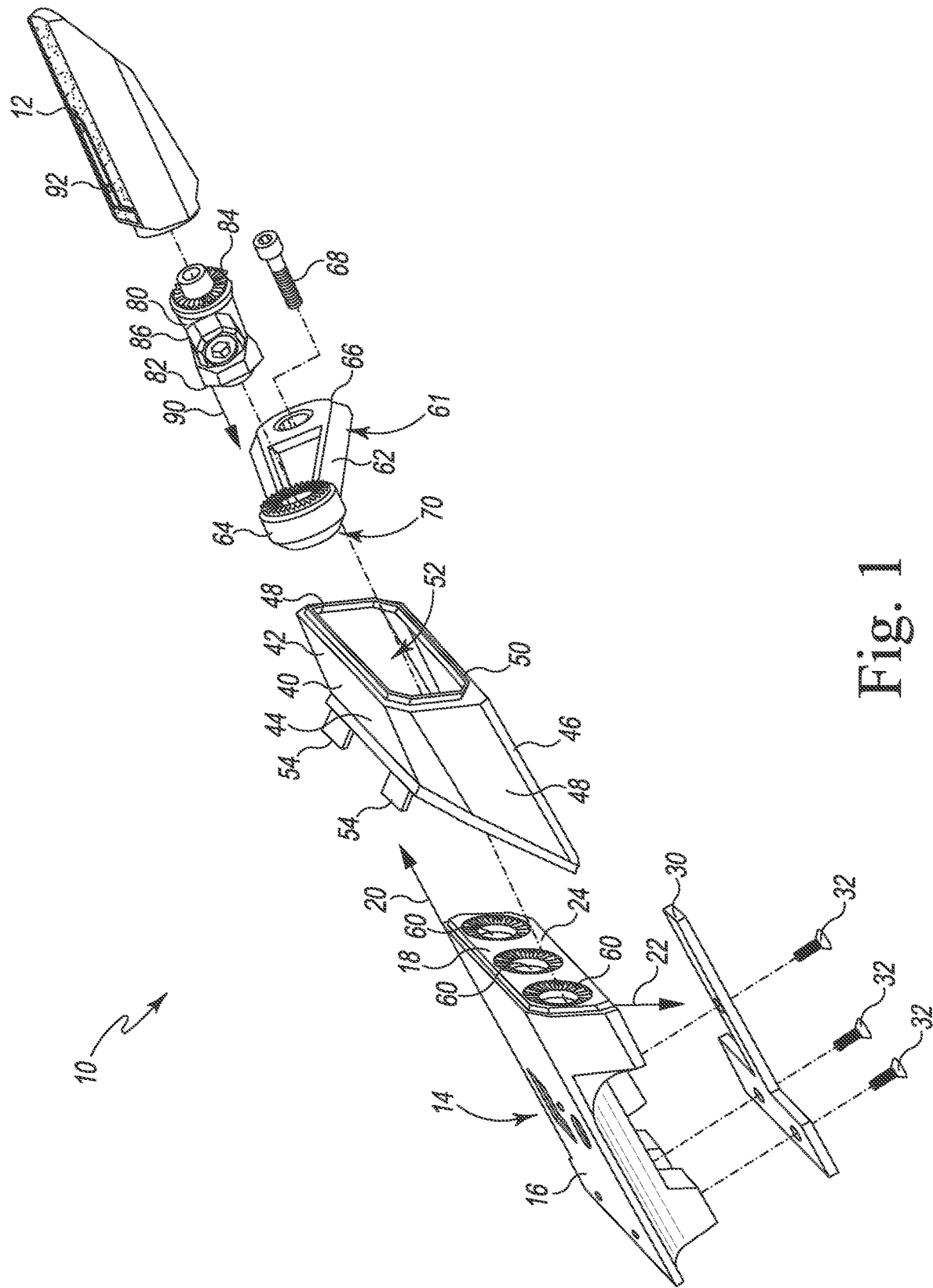
FIG. 1 is an exploded view of an assembly configured to be mounted on a motorcycle.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, an assembly 10 is provided for attaching a foot peg 12 to a motorcycle (not shown). The assembly 10 and the parts of the assembly are made from stainless steel, alloys, composites, or similar materials used with motorcycle parts. The assembly 10 couples the peg 12 to a frame of the motorcycle. In the illustrative embodiments, the assembly 10 couples the peg 12 to a crash guard (shown in FIG. 11) of the motorcycle. The assembly 10 includes various components that are selectively to improve a rider's comfort. That is, the peg 12 can be attached a different positions relative to a seat of the motorcycle to accommodate a length of the rider's legs. Additionally, each rotational position of the components describe herein is selected to position a foot surface of the peg 12 for the rider's comfort.

The assembly 10 includes a mounting assembly 14 configured to be coupled to a first side of the crash guard (as described in more detail below). The mounting assembly 14 includes a mounting flange 16 and an outer wall 24 extending from the mounting flange 16. The outer wall 24 includes a substantially planar front face 18. The mounting flange 16 extends non-orthogonal to the front face 18 of the outer wall 24. A mounting plate 30 is configured to be coupled to a second side of the crash guard to form a joint, so that the crash guard is positioned between the mounting plate 30 and the mounting flange 16 within the joint. The mounting plate 30 is coupled to the mounting flange 16 with fasteners 32, illustrated as screws.

The assembly 19 includes a cover 40 that is positionable over the mounting assembly 14. The cover 40 includes a body 42 having a top wall 44, a bottom wall 46, and a pair of side walls 48 extending between the top wall 44 and the bottom wall 46. The walls 44, 46, 48 are configured to be positioned around the mounting flange 16. The cover 40 also includes a front face 50 and an opening 52 extending through the front face 50. The opening 52 is sized to receive the mounting assembly 14, so that the front face 18 of the mounting assembly 14 extends from the opening 52. A pair of flanges 54 extends from the cover 40 to snap the cover 40 into an opening formed in the motorcycle (as described in more detail below).

The outer wall 24 of the mounting assembly 14 includes a plurality of attachment slots 60 that are defined in the front face 18. In the illustrated embodiment, the outer wall 24 includes three attachment slots 60. However, in other embodiments, the outer wall 24 may include any number of attachments slots 60, including only one attachment slot 60. The attachment slots 60 provide locations to selectively couple an arm 62 to the outer wall 24 of the mounting assembly 14.

The arm 62 includes an elongated body 61 having a first end 64 and a second end 66. The first end 64 includes a mounting peg 70 configured to be coupled to an attachment slot 60 with a fastener 68, illustrated as a screw. The arm 62 is rotatably coupled to the outer wall 24 to locate the second end 66 of the arm 62 at various angular positions relative to the outer wall 24. The first end 64 of the arm 62 provides a pivot point 72 around which the arm 62 can rotate to position the second end 66 of the arm 62.

The second end 66 of the arm 62 is configured to be coupled to a peg mount 80 having a first end 82 and a second end 84. The first end 82 of the peg mount 80 is rotatably coupled to the second end 66 of the arm 62 to locate the second end 84 of the peg mount 80 at various angular positions relative to the second end 66 of the arm 62. The first end 82 of the peg mount 80 provides a pivot point around which the peg mount 80 rotates to position the second end 84 of the peg mount 80. The peg mount 80 also includes a hinge 86 coupling the first end 82 and the second end 84. The second end 84 moves relative to the first end 82 about the hinge 86 to alter an angle of the second end 84 relative to the first end 82. When coupled to the arm 62, the first end 82 of the peg mount 80 extends orthogonal to the outer wall 24 of the mounting assembly 14 and non-orthogonal to the mounting flange 16 of the mounting assembly 14.

The peg 12 is configured to be coupled to the second end 84 of the peg mount 80 along a longitudinal axis 88 that is orthogonal to the front face 18. The peg 12 is rotatably coupled to the peg mount 80 so that an angular position of the peg 12 can be altered. A foot surface 92 of the peg 12 may be configured to extend horizontally. Alternatively, the foot surface 92 may be configured to extend at an angle facing a rider of the motorcycle or facing away from the rider of the motorcycle.

Referring to FIG. 2, the mounting assembly 14 includes side walls 100 extending downward from the mounting flange 16. The side walls 100 extend rearward from the outer wall 24 along a portion of a length 102 of the mounting assembly 14. When the cover 40 is positioned on the mounting assembly 14, at least a portion of the side walls 100 extend through the opening 52 in the cover 40. Curved gussets 104 extend between the side walls 100 and the mounting flange 16.

The mounting flange 16 includes side edges 110 that extend from the front face 18 to a rear edge 112. One of the side edges 110 includes a curved notch 114 that is sized to fit around the crash guard. The mounting flange 16 includes a top surface 116 that extends between the side edges 110. The top surface 116 extends between the outer wall 24 and the rear edge 112. Openings 120 are formed in the top surface 116. In the illustrative embodiment, the top surface 116 includes three openings 120. In other embodiments, the top surface 116 may include any number of openings 120.

As described above, the mounting assembly 14 has a plurality of attachment slots 60 defined in the front face 18. Each attachment slot 60 on the front face 18 is generally circular and includes a threaded opening 130 configured to receive the fastener 68. Ribs 132 extend from the opening 130 to an outer edge 134. The ribs 132 define a plurality of teeth 136 formed circumferentially around the opening 130.

Referring now to FIG. 3, the mounting assembly 14 includes a bottom side 140. The bottom side 140 includes a front surface 142 that extends between the side walls 100. The front surface 142 extends from the outer wall 24 partially along the length 102 of the mounting assembly 14 to a curved end 144. The curved end 144 is sized and shaped to fit around the crash guard. A slot 148 is defined in the front surface 142. The bottom side 140 also includes a plurality of mounting surfaces 146. In the illustrative embodiment, the bottom side 140 includes three mounting surfaces 146. However, the bottom side 140 may include any number of mounting surfaces 146, including one. An opening 150 is formed in each mounting surface 146. The number of openings 150 corresponds to the number of openings 120 defined in the top surface 116. Bores 152 extend from the openings 150 to the openings 120 and are sized to receive the fasteners 32.

A curved channel 160 is formed in the bottom side 140. The curved channel 160 extends between an end 162 at the rear edge 112 to another end 164 also formed at the rear edge 112. An apex 166 of the curved channel 160 is defined at the outer wall 24. A curved side wall 170 defines a portion of the curved channel 160. The curved side wall 170 forms an inner wall 172 of the curved channel 160. Each of the mounting surfaces 146 is positioned within the curved side wall 170. A pair of open slots 178 extends from the curved flanges 104 to the end 162 of the channel 160. The curved channel 160 extends along the length 102 of the mounting assembly 14 to the side walls 100. An end wall 174 of the curved channel 160 is formed at the front face 18. The end wall 174 extends from the curved end 144 of the front surface 142. The curved channel 160 may be described as being substantially U-Shaped. The curved channel 160 is sized and shaped to secure around the crash guard. In an embodiment where the crash guard has a different shape, the curved channel 160 may be configured to fit around such a crash guard.

Referring now to FIG. 4, the mounting plate 30 includes a beam 180 and a beam 182 extending orthogonal to the beam 180. The mounting plate 30 is substantially T-shaped; however, other shapes may be contemplated. When the mounting plate 30 is coupled to the mounting assembly 14 a joint is formed wherein an end 188 of the beam 180 is positioned in the slot 148 of the mounting assembly 14. An end 196 of the beam 182 is positioned under a first open slot 178 of the mounting assembly 14, and the beam 182 extends to an end 198 positioned under a second open slot 178 of the mounting assembly 14. A screw hole 184 extends through each of the openings 186 defined in the beam 180. Screw holes 190 extend through openings 192 defined in the ends 196, 198 of the beam 182. The screw holes 184, 190 are configured to align with the bores 152 formed in the mounting assembly 14, when the mounting plate 30 is coupled to the mounting assembly 14. The fasteners 32 are advanced through the screw holes 184, 190 of the mounting plate 30 and into the bores 152 of the mounting assembly 14 to couple the mounting plate 30 to the mounting assembly 14.

Figure 5:
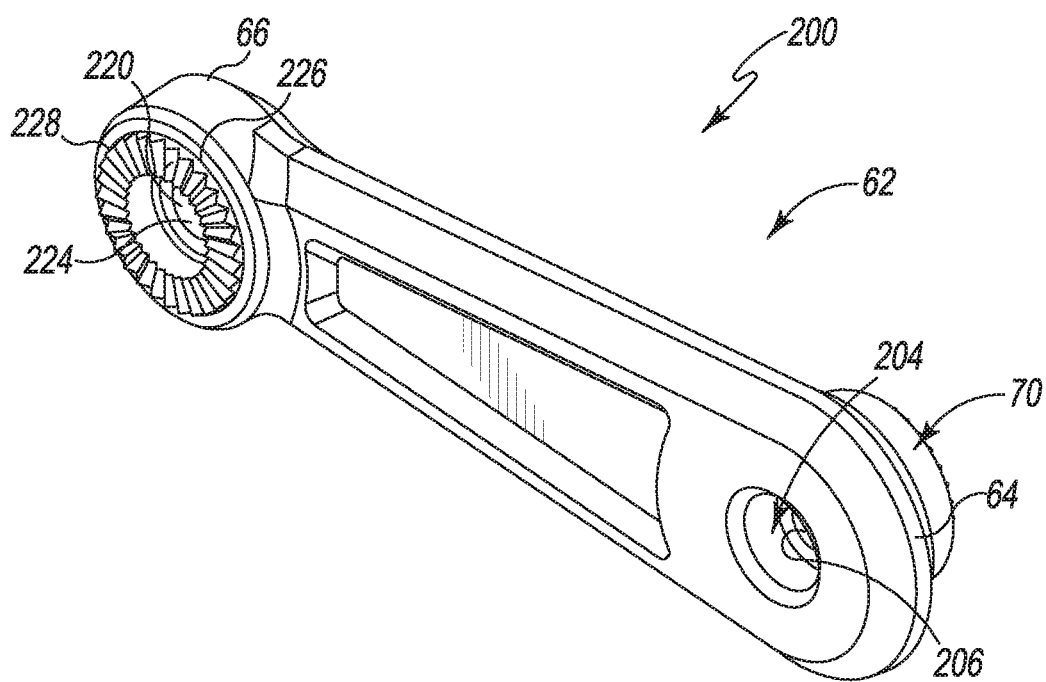
FIG. 5 is a perspective view of an outward-facing side of the arm shown in FIG. 1.
Figure 6:
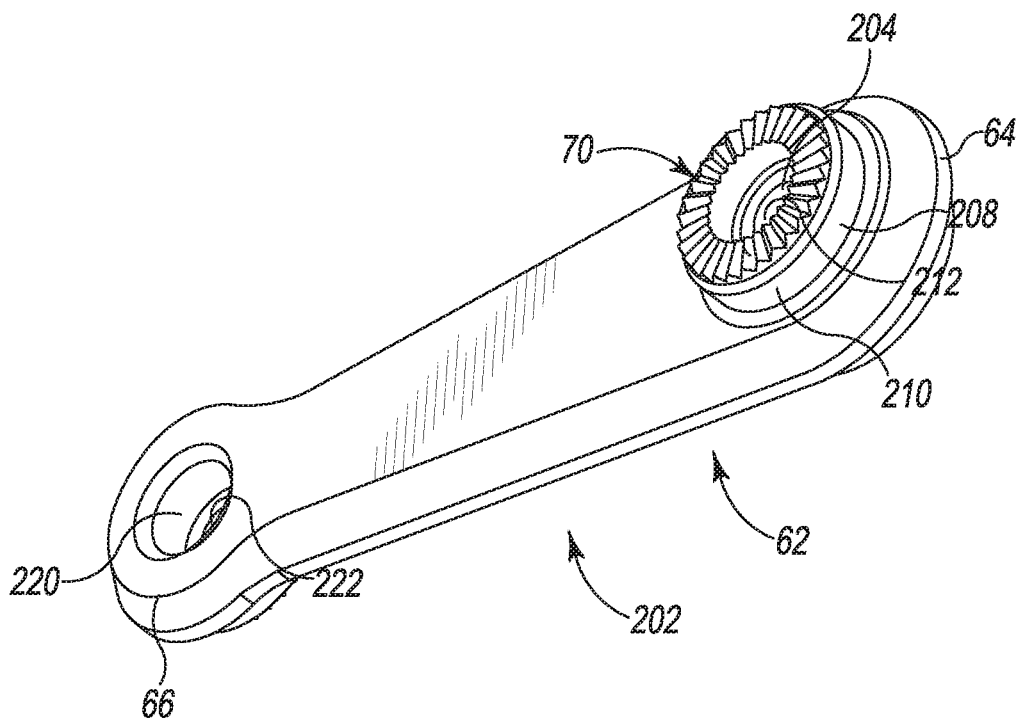
FIG. 6 is a perspective view of an inward-facing side of the arm shown in FIG. 1.

Referring now to FIGS. 5 and 6, the arm 62 includes an outward facing side 200 (shown in FIG. 5) and an inward facing side 202 (shown in FIG. 6). The first end 64 of the arm 62 includes a bore 204 extending from an opening 206 defined in the outward facing side 200 to an opening 208 defined in the inward facing side 202. The bore 204 is configured to receive a fastener through the mounting peg 70 to couple the arm 62 to an attachment slot 60 of the front face 18. On the inward facing side 202 of the arm 62, a plurality of ribs 210 extend radially outward from the opening 208 and form a plurality of teeth 212. The teeth 212 are configured to mesh with the teeth 136 positioned in the attachment slot 60. That is, as the mounting peg 70 is secured, the teeth 212 lock into the teeth 136 to prevent rotation of the arm 62 relative to the front face 18. To adjust an angular position of the arm 62 relative to the front face 18, the fastener 68 is loosened to unlock the teeth 212 and the teeth 136. The arm 62 can then be rotated and secured with the teeth 212 at a different angular position.

The second end 66 of the arm 62 includes a bore 220 extending from an opening 222 defined in the inward facing side 202 to an opening 224 defined in the outward facing side 200. The bore 220 is configured to receive a post of the peg mount 80 (as described in more detail below). On the outward facing side 200 of the arm 62, a plurality of ribs 226 extend radially outward from the opening 224 and define a plurality of teeth 228.

Figure 8:
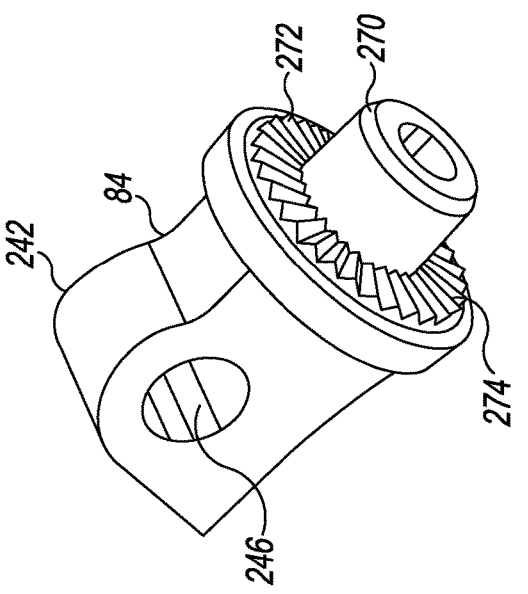
FIG. 8 is a side perspective view of a second end of the peg mount shown in FIG. 1.
Figure 9:
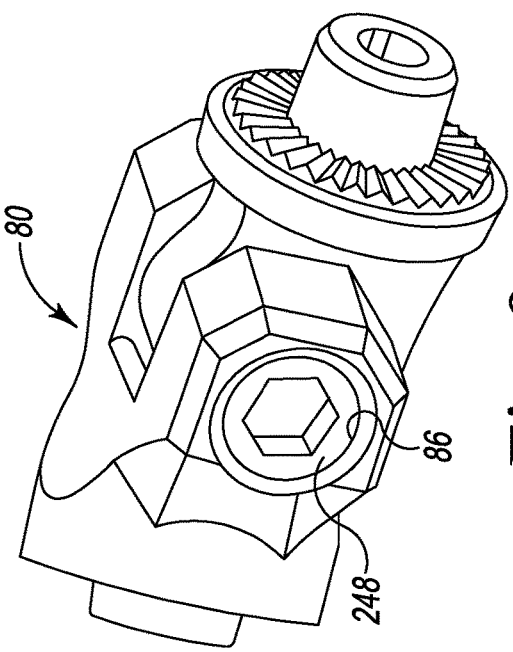
FIG. 9 is a side perspective view of the first end of the peg mount shown in FIG. 7 coupled to the second end of the peg mount shown in FIG. 8.
Figure 7:
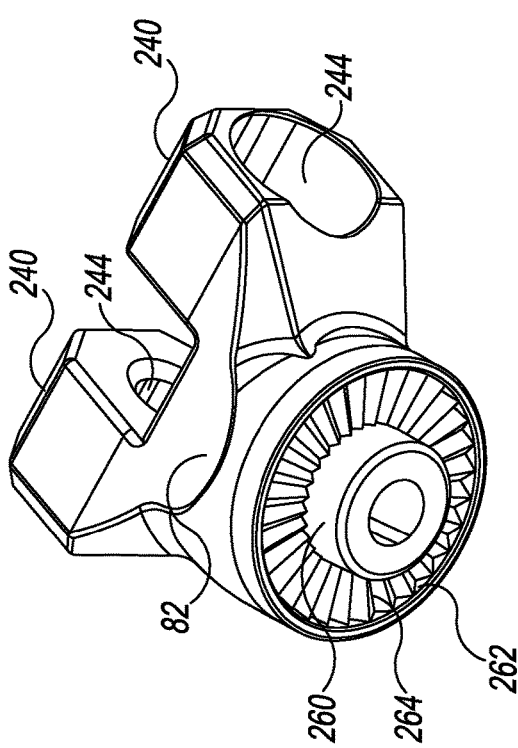
FIG. 7 is a side perspective view of a first end of the peg mount shown in FIG. 1.

Referring now to FIGS. 7-9, the peg mount 80 includes the first end 82 coupled to the second end 84 with the hinge 86. The hinge 86 is formed by a pair of flanges 240 extending from the first end 82 and a flange 242 extending from the second end 84. Pin holes 244 extend through the flanges 240. A pin hole 246 extends through the flange 242. The flange 242 is positioned between the flanges 240 such that the pin holes 244 are aligned with the pin hole 246. A pin 248 is inserted through the pin holes 244 and the pin hole 246 to couple the first end 82 and the second end 84 as shown in FIG. 9. The pin 248 enables the second end 84 to rotate about the pin 248 relative to the first end 82.

A post 260 extends from the first end 82. A plurality of ribs 262 extends radially outward from the post 260 to define a plurality of teeth 264. The post 260 is configured to be secured into the bore 220 of the arm 62 with a fastener, e.g. a screw or bolt, (not shown). When the peg mount 80 is secured to the arm 62, the teeth 264 of the peg mount 80 engage and lock into the teeth 228 of the arm 62 to prevent rotation of the peg mount 80 relative to the arm 62. To adjust an angular position of the peg mount 80 relative to the arm 62, the fastener is loosened to unlock the teeth 264 and the teeth 228. The peg mount 80 can then be rotated and secured with the teeth 264 at a different angular position.

A post 270 extends from the second end 84. A plurality of ribs 272 extends radially outward from the post 270 to define a plurality of teeth 274. The post 270 and the teeth 274 are configured to be coupled to the peg 12 (as described in more detail below).

Figure 10:
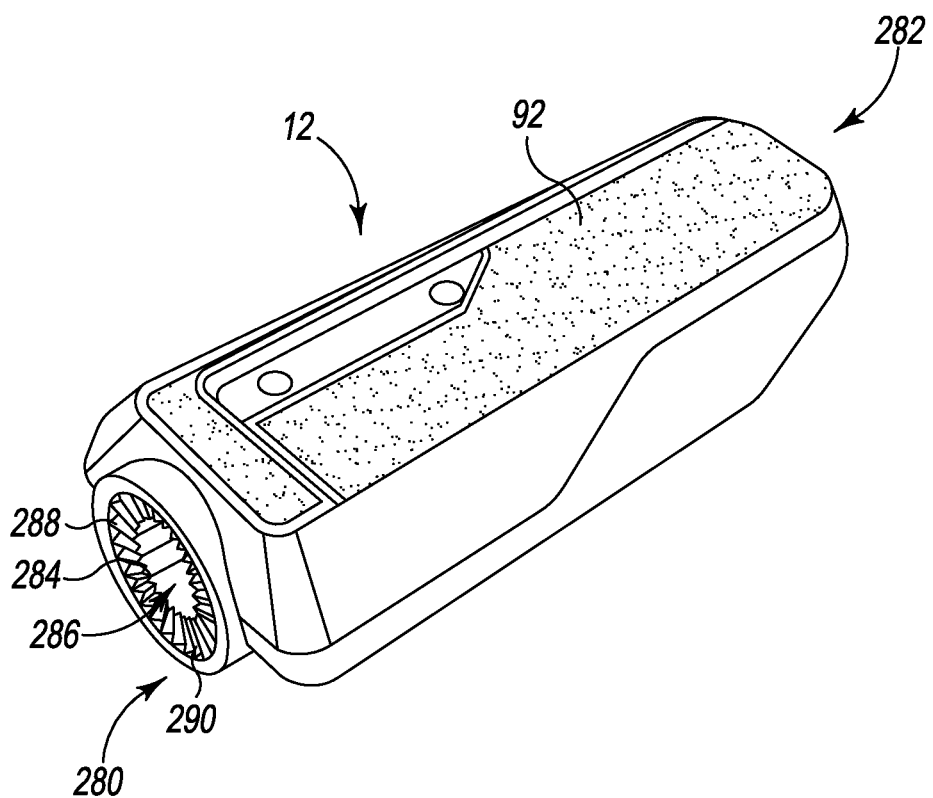
FIG. 10 is a side perspective view of the peg shown in FIG. 1.

Referring to FIG. 10, the peg 12 includes the foot surface 92. The foot surface 92 is generally planar and provides a location for a rider of the motorcycle to rest their feet. The foot surface 92 extends between a first end 280 and a second end 282 of the peg 12. A bore 284 extends inwardly from an opening 286 defined in the first end 280 of the peg 12. A plurality of ribs 288 extends radially outward from the bore 284 to define a plurality of teeth 290. The post 270 of the peg mount 80 is configured to be secured within the bore 284 with a fastener (not shown). That is, the post 270 of the peg mount 80 is inserted into the bore 284. When the post 270 is inserted into the bore 284, the teeth 290 of the peg 12 engage and lock into the teeth 274 of the peg mount 80 to prevent rotation of the peg 12 relative to the peg mount 80. To adjust an angular position of the peg 12 relative to the peg mount 80, the fastener is loosened to unlock the teeth 290 and the teeth 274. The peg 12 can then be rotated and secured with the teeth 290 at a different angular position.

Figure 11:
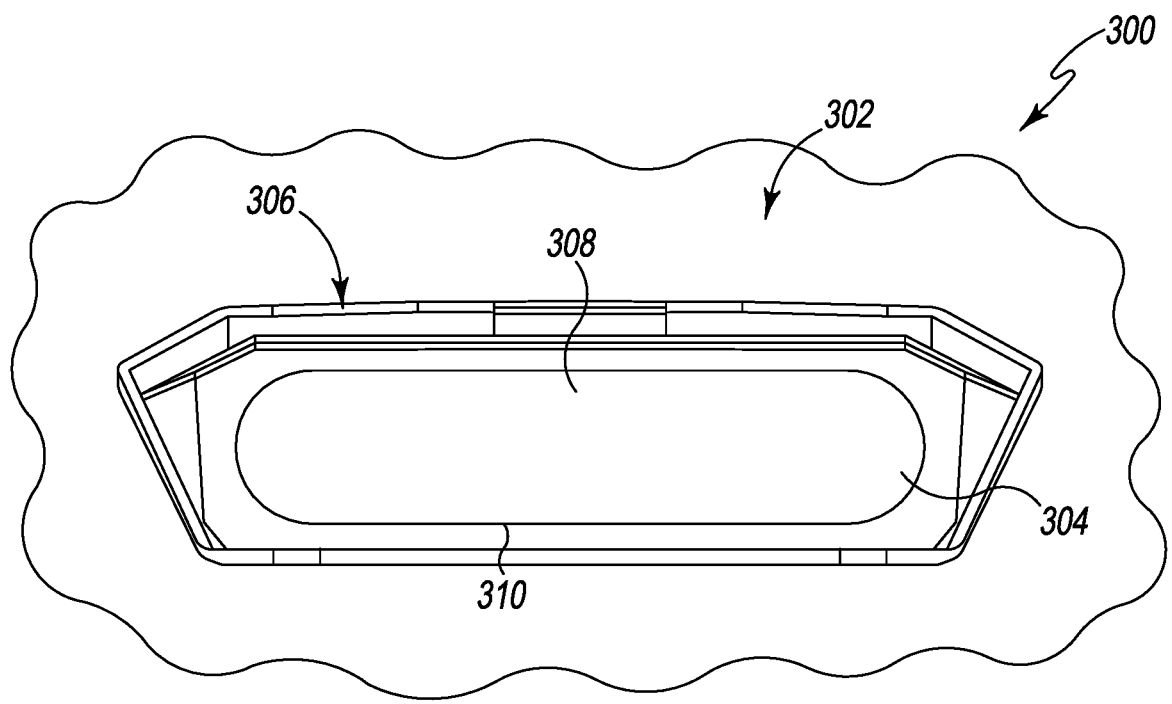
FIG. 11 is a side perspective view of a portion of a motorcycle having a frame.

Referring to FIG. 11, a side 300 of a motorcycle 302 includes a frame 312 having a crash guard 304. The crash guard 304 is a generally rounded pipe. The crash guard 304 is positioned within an opening 306 in the motorcycle 302 and initially covered with a cover (not shown) that can be removed to access the crash guard 304. To secure the assembly 10 to the crash guard 304 with the cover removed, the mounting assembly 14 is positioned on a top 308 of the crash guard 304 so that the crash guard 304 is positioned within the curved channel 160 of the mounting assembly 14.

The curved channel 160 is sized and shaped to position around the crash guard 304. The mounting plate 30 is then positioned on a bottom 310 of the crash guard 304 and secured to the mounting assembly 14 with the fasteners 32. The cover 40 is then snapped into the opening 306 by securing the flanges 54 within the opening 306.

Figure 12:
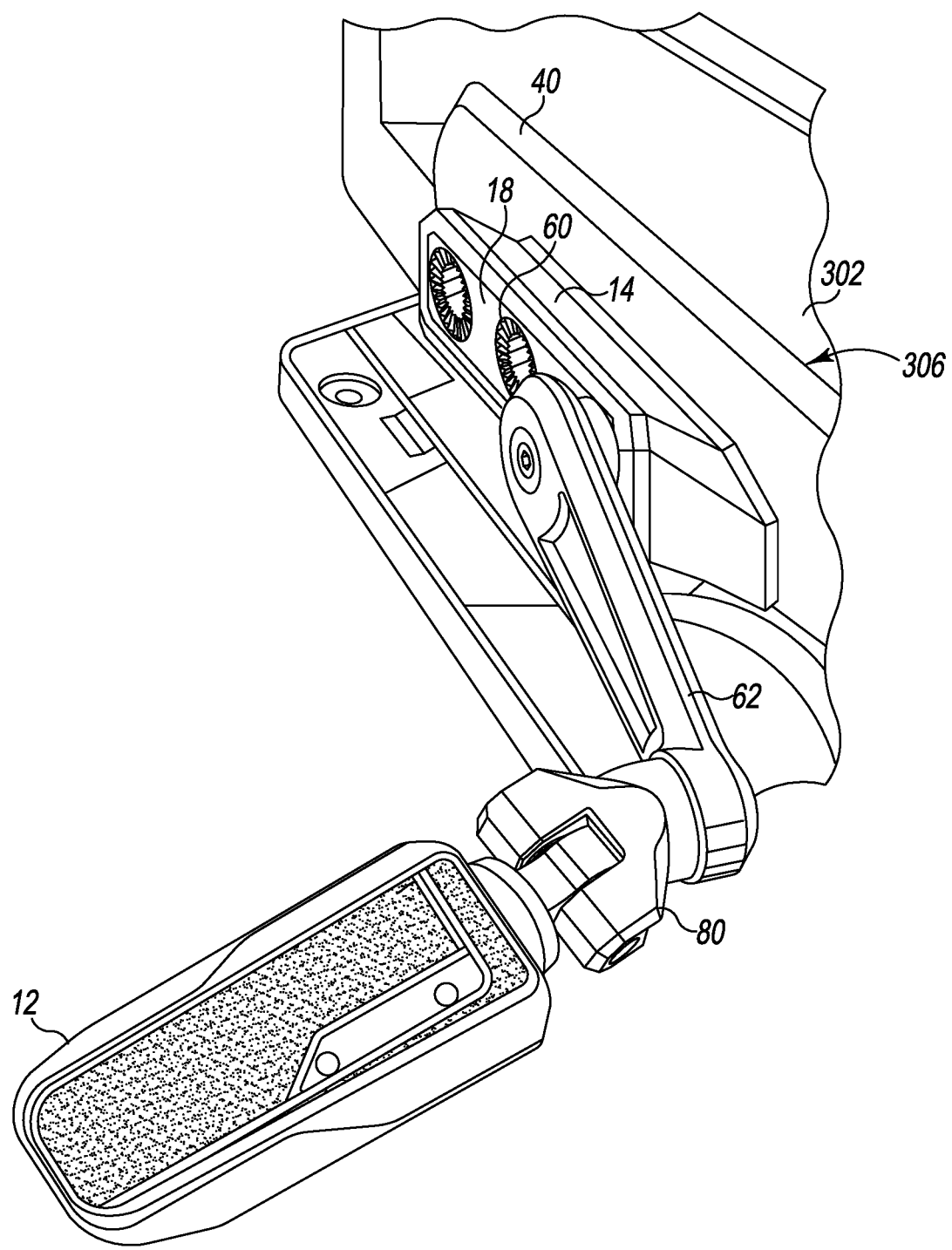
FIG. 12 is a side perspective view of the assembly shown in FIG. 1 in an assembled configuration and mounted to the motorcycle shown in FIG. 11.

When fully assembled, as illustrated in FIG. 12, the front face 18 of the mounting assembly 14 extends outward from the opening 306 in the motorcycle 302. The cover 40 couples to the mounting assembly 14 so that the front face 18 extends through the opening 52 in the cover 40. When the motorcycle 302 is positioned substantially vertically upright on a floor, the front face 18 of the mounting assembly 14 extends substantially vertical from the floor. The arm 62 extends outward from one of the attachment slots 60 and is secured in a desired rotational position. The peg mount 80 extends outward from the arm 62 and is also secured in a desired rotational position. The second end 84 of the peg mount 80 may be angled to a desired angle with relative to the first end 82 of the peg mount 80. The peg 12 extends outward from the peg mount 80 and is also rotated to desired rotational position.

It should be noted that, the attachment slot 60 may be selected based on the rider's comfort. That is, each attachment slot 60 positions the peg 12 at a different position relative to a seat of the motorcycle to accommodate a length of the rider's legs. Additionally, each rotational position of the components describe herein is selected to position the foot surface 92 of the peg 12 for the rider's comfort. By altering rotational positions, the foot surface 92 may be raised or lowered or angled relative to the rider.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the devices and assemblies described herein. It will be noted that alternative embodiments of the devices and assemblies of the present disclosure may not include all of the features described yet still benefit from at least some of the advantages of such features. Those of ordinary skill in the art may readily devise their own implementations of the devices and assemblies that incorporate one or more of the features of the present invention and fall within the spirit and scope of the present disclosure as defined by the appended claims.

The invention claimed is:

1. A foot peg assembly for a motorcycle, comprising:
a mounting assembly comprising:
a mounting flange including an outer wall having a substantially planar front face and a lower surface extending from the outer wall such that a non-orthogonal angle is defined between the substantially planar front face and the lower surface, and
a mounting plate configured to be coupled to the mounting flange to secure the mounting assembly to the motorcycle,
an arm including an elongated body extending from a first end coupled to the outer wall of the mounting assembly to a second end, and
a peg coupled to the second end of the arm, the peg extending along a longitudinal axis that extends orthogonal to the substantially planar front face of the outer wall.

2. The peg assembly of claim 1, wherein:
the outer wall includes a plurality of attachment slots, and
the arm includes a mounting peg configured to be received in one of the plurality of attachment slots.

3. The peg assembly of claim 2, wherein the outer wall includes three attachment slots.

4. The peg assembly of claim 2, wherein:
the mounting peg of the arm extends along a longitudinal axis and includes a first plurality of teeth,
the outer wall includes a second plurality of teeth in each attachment slot, and
the first plurality of teeth are configured to selectively engage the second plurality of teeth to position the arm at a plurality of angular positions relative to the longitudinal axis.

5. The peg assembly of claim 1, wherein the mounting flange includes a channel sized to receive a portion of a frame of the motorcycle.

6. The peg assembly of claim 5, wherein the channel of the mounting flange and the mounting plate cooperate to define a joint configured to receive the portion of the frame to secure the mounting assembly to the motorcycle.

7. The peg assembly of claim 6, wherein the mounting plate includes a first beam extending under the channel to define a portion of the joint.

8. The peg assembly of claim 7, wherein the lower surface of the mounting flange includes a slot sized to receive an end of the first beam.

9. The peg assembly of claim 7, wherein the mounting flange includes a pair of open slots that are connected to the channel and cooperate with the mounting flange and the mounting plate to define the joint.

10. The peg assembly of claim 9, wherein the mounting plate includes a second beam extending orthogonal to the first beam, the second beam extending from a first end positioned under a first open slot of the pair of open slots to a second end positioned under a second open slot of the pair of slots.

11. The peg assembly of claim 5, wherein the channel includes a curved section.

12. The peg assembly of claim 1, further comprising a peg mount positioned between the arm and the peg and configured to selectively engage the arm to position the peg at a plurality of angular positions relative to the longitudinal axis.

13. The peg assembly of claim 12, wherein the peg mount includes a first end hingedly attached to a second end so that the second end is rotatable relative to the first end.

14. A method of coupling a peg to a motorcycle, the method comprising:
securing a portion of a frame of the motorcycle between a mounting plate and a mounting flange, the portion of the frame extending along a first axis,
attaching an arm to an outer wall of the mounting flange, the outer wall including a substantially planar front face extending at a non-orthogonal angle relative to the first axis, and
coupling a peg to the arm such that the peg extends along a second axis that extends orthogonal to the substantially planar front face of the outer wall.

15. The method of claim 14, further comprising:
selecting an attachment slot from a plurality of attachment slots defined in the outer wall,
wherein attaching the arm to the outer wall includes positioning a mounting peg of the arm in the selected attachment slot.

16. The method of claim 15, wherein attaching the arm to the outer wall includes rotating the arm about a third axis defined by the mounting peg.

17. The method of claim 16, wherein rotating the arm about the third axis defined by the mounting peg includes selectively engaging a first plurality of teeth of the mounting peg with a second plurality of teeth positioned in the selected attachment slot.

18. The method of claim 14, further comprising positioning the portion of the frame in a channel defined in the mounting flange.

19. The method of claim 18, wherein positioning the portion of the frame includes positioning a crash guard of the motorcycle in the channel defined in the mounting flange.

20. The method of claim 14 further comprising coupling a peg mount between the arm and the peg, the peg mount configured to selectively engage the arm to position the peg at one of a plurality of angular positions relative to the longitudinal axis.

\* \* \* \* \*